(12) United States Patent
Lin et al.

(10) Patent No.: US 7,260,272 B2
(45) Date of Patent: Aug. 21, 2007

(54) METHOD AND APPARATUS FOR NOISE REDUCTION USING DISCRETE WAVELET TRANSFORM

(75) Inventors: Peng Lin, Irvine, CA (US);
Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 949 days.

(21) Appl. No.: 10/617,064

(22) Filed: Jul. 10, 2003

(65) Prior Publication Data

US 2004/0008904 A1    Jan. 15, 2004

(51) Int. Cl.
*G06K 9/40* (2006.01)

(52) U.S. Cl. .................................. 382/275

(58) Field of Classification Search ........ 382/270–275, 382/254, 260–269, 131–132, 232–233, 240, 382/248, 190–191; 375/350, 240.18–240.2, 375/240.29, 240.11; 324/309; 600/437
See application file for complete search history.

(56) References Cited

U.S. PATENT DOCUMENTS

| | | | |
|---|---|---|---|
| 5,619,998 A | 4/1997 | Abdel-Malek | 600/437 |
| 6,094,050 A | 7/2000 | Zaroubi | 324/309 |
| 6,741,739 B1 | 5/2004 | Vincent | 382/191 |
| 6,801,672 B1 | 10/2004 | Thomas | 382/275 |
| 6,823,090 B2 | 11/2004 | Matsuura | 382/275 |
| 6,975,753 B2 * | 12/2005 | Matsuura et al. | 382/132 |
| 7,099,417 B2 * | 8/2006 | Siegel et al. | 375/350 |

* cited by examiner

*Primary Examiner*—Ishrat Sherali
(74) *Attorney, Agent, or Firm*—Kenneth L. Sherman, Esq.; Michael Zarrabian, Esq.; Myers Dawes Andras & Sherman LLP

(57) ABSTRACT

An improved noise reduction process by wavelet thresholding utilizes a discrete wavelet transform to decompose the image into different resolution levels. A thresholding function is then applied in different resolution levels with different threshold values to eliminate insignificant wavelet coefficients which mainly correspond to the noise in the original image. Finally, an inverse discrete wavelet transform is applied to generate the noise-reduced video image. The threshold values are based on the relationships between the noise standard deviations of different decomposition levels in the wavelet domain and the noise standard deviation of the original image.

32 Claims, 4 Drawing Sheets

METHOD AND APPARATUS FOR NOISE REDUCTION USING DISCRETE WAVELET TRANSFORM

FIELD OF THE INVENTION

The present invention relates generally to image processing, and more particularly to noise reduction in images.

BACKGROUND OF THE INVENTION

Video images are often corrupted by noise in the acquisition or transmission process. In order to improve the visual appearance of the images, an effective filtering technique is often required to reduce the noise level. The goal of the noise reduction is to remove the noise while retaining as much of important image features as possible.

Conventional noise reduction processes primarily involve linear processing in either spatial or spectrum domain. However, while reducing noise by attenuating the high frequency image components, linear processing removes some important image details as well.

As such, there has been a trend in developing nonlinear noise reduction processes. One such process is wavelet thresholding. In the wavelet domain, important image features are represented by large coefficients while noise components are usually represented by small/insignificant coefficients. Wavelet thresholding provides a tool for separating noise signals from image signals. The basic idea of the wavelet thresholding is that noise can be removed by eliminating the insignificant coefficients relative to some threshold value. Therefore, in this approach, the discrete wavelet transform of an image signal is calculated and the resultant wavelet coefficients are threshold level tested. The coefficients that are smaller than a certain threshold value are removed. Then the resultant coefficients are used to reconstruct the signal. If a signal has its energy concentrated in a small number of wavelet coefficients, its coefficient values will be relatively large compared to the noise (which has its energy spread over a large number of coefficients).

A crucial step in wavelet thresholding, is the selection of the threshold values. Improperly selected threshold values not only affect the performance of the noise reduction process, but also create visually annoying artifacts. Although several attempts have been made in developing various methods of selecting threshold value, such selection methods have shortcomings in proper selection of threshold value, most of those methods were targeting at denoising of highly noisy images. When they are applied to the applications that require good quality images, they often create noticeable artifacts.

BRIEF SUMMARY OF THE INVENTION

An object of the present invention is to provide an improved noise reduction process by wavelet thresholding, that reduces noise level in video images and retains as much of the important image features as possible. In one embodiment, such an improved process first utilizes a discrete wavelet transform to decompose the image into different resolution levels. Then, a thresholding function is applied in different resolution levels with different threshold values to eliminate insignificant wavelet coefficients which mainly correspond to the noise in the original image. Finally, an inverse discrete wavelet transform is applied to generate the noise-reduced video image.

According to an aspect of the present invention, the selection of the threshold values in the second step of the noise reduction procedure above is based on the relationships between the noise standard deviations of different decomposition levels in the wavelet domain and the noise standard deviation of the original image. In one example, for any fixed discrete wavelet transform: (1) the noise standard deviations of different decomposition levels in the wavelet domain decrease as the decomposition levels increase, and (2) the noise standard deviations in the wavelet domain are linearly dependent on the noise standard deviation of the original image. This linear dependency provides a natural choice of the threshold values for wavelet thresholding. For every discrete wavelet transform, the noise standard deviations in the wavelet domain have their unique linear dependency of the noise standard deviation of the original image. Using this linear dependency in wavelet thresholding is important in producing artifacts free, natural looking denoised image, according to the present invention.

Other objects, features and advantages of the invention will be apparent from the following specification taken in conjunction with the following drawings.

DETAILED DESCRIPTION OF THE INVENTION

Figure 1:
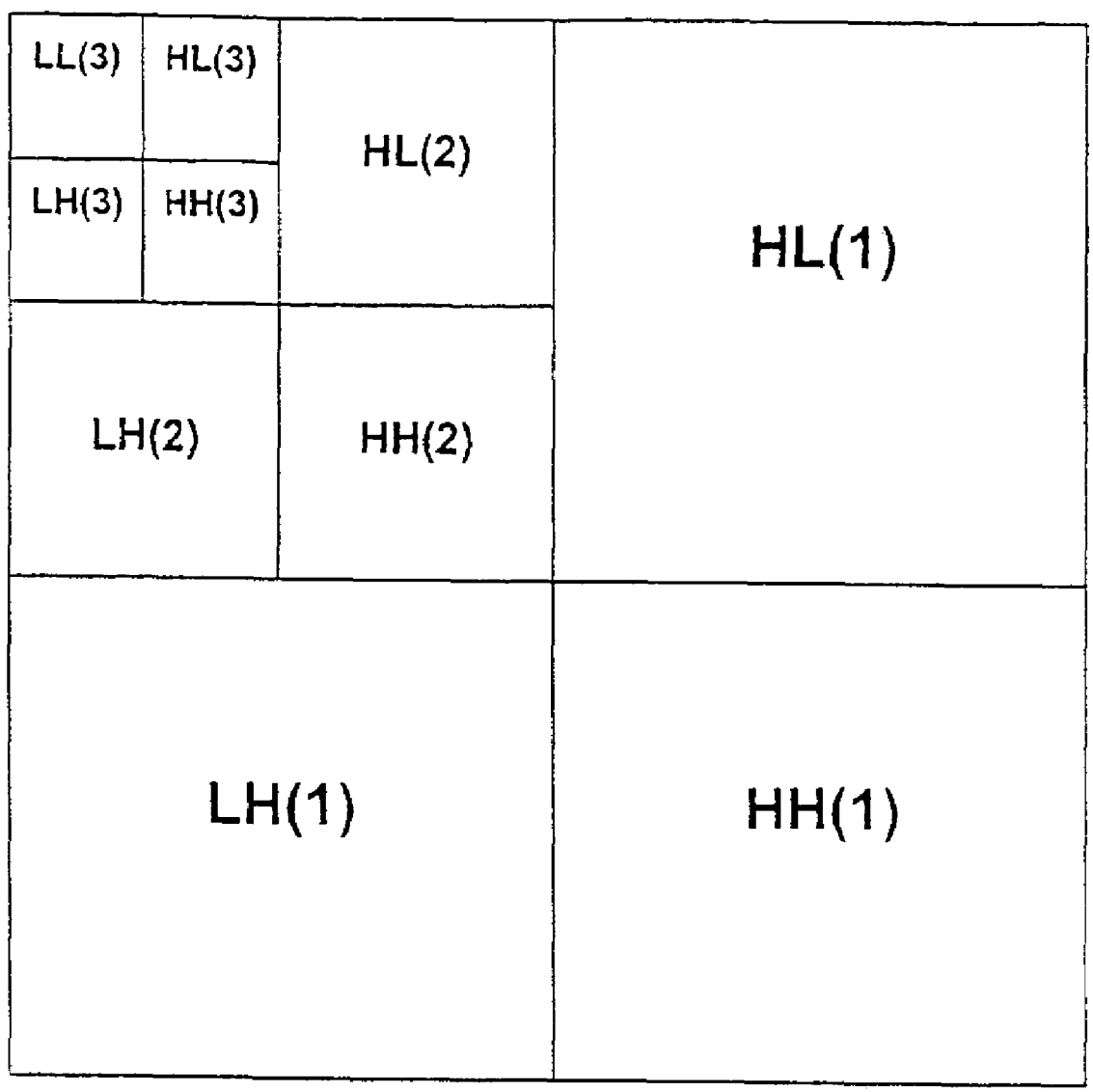
FIG. 1 shows a typical 3-level wavelet decomposition of an image using discrete wavelet transform.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

As noted above, in one embodiment the present invention provides an improved noise reduction process by wavelet thresholding, that reduces noise level in video images and retains as much of the important image features as possible. In one embodiment, such an improved process first utilizes a discrete wavelet transform to decompose the image into different resolution levels. Then, a thresholding function is applied in different resolution levels with different threshold values to eliminate insignificant wavelet coefficients which mainly correspond to the noise in the original image. Finally, an inverse discrete wavelet transform is applied to generate the noise-reduced video image.

The selection of the threshold values in the second step of the noise reduction procedure above is based on the relationships between the noise standard deviations of different decomposition levels in the wavelet domain and the noise standard deviation of the original image. In one example, for any fixed discrete wavelet transform: (1) the noise standard deviations of different decomposition levels in the wavelet domain decrease as the decomposition levels increase, and (2) the noise standard deviations in the wavelet domain are linearly dependent on the noise standard deviation of the original image. This linear dependency provides a natural choice of the threshold values for wavelet thresholding. For every discrete wavelet transform, the noise standard deviations in the wavelet domain have their unique linear dependency of the noise standard deviation of the original image. Using this linear dependency in wavelet thresholding is important in producing artifacts free, natural looking denoised image, according to the present invention.

Wavelet transformation typically involves decomposing a signal into a family of functions which are the translation and dilation of a unique function. In practice, the wavelet transform is implemented by the discrete wavelet transform. An example procedure for decomposing an image using discrete wavelet transform is as follows. A pair of low pass and high pass filters are chosen, such that the filters exactly halve the frequency range between themselves. Then, for an image represented by a two dimensional array of pixel data, the low pass filter is applied for each row of data to get the low frequency components of the row, and the resulting signal is down-sampled by two. Then the high pass filter is applied for the same row of data to get the high pass components of the row, and the resulting signal is down-sampled by two and placed to the side of the low pass components. This procedure is performed for all rows. Next, a similar filtering procedure is applied for each column of the intermediate data.

Referring to the example in FIG. 1, a resulting two-dimensional array 10 of coefficients includes four bands of data, labeled as ll (low-low), hl (high-low), lh (low-high) and hh (high-high). While the high pass bands hh, lh and hl include detail information, the low pass band ll still includes most of the information of the original image. The ll band can be further decomposed in a similar manner described above, thereby producing even more subbands. The decomposing process can be performed to any desired level, resulting in a multi-level or multi-resolution decomposition of an image. The example in FIG. 1 shows a 3-level wavelet decomposition using discrete wavelet transform. The number in each parenthesis indicates the level of the decomposition.

Corresponding to the discrete wavelet transform, is the inverse discrete wavelet transform. Just as discrete wavelet transform is used to separate the image into various classes of data, inverse discrete wavelet transform is used to reassemble the various classes of data into a reconstructed image. In an example inverse discrete wavelet transform implementation, a pair of high pass and low pass filters are used. The filtering procedure is the opposite of the corresponding discrete wavelet transforms. Starting from four subband images in the deepest level, first the filters are applied to each subband images column-wise after the column data are up-sampled by two. Next, the filters are applied row-wise to the intermediate data after they have been up-sampled by two. The resulting four signals are added together appropriately. Then a similar procedure proceeds to the next level, until the zero level is reached.

Figure 2:
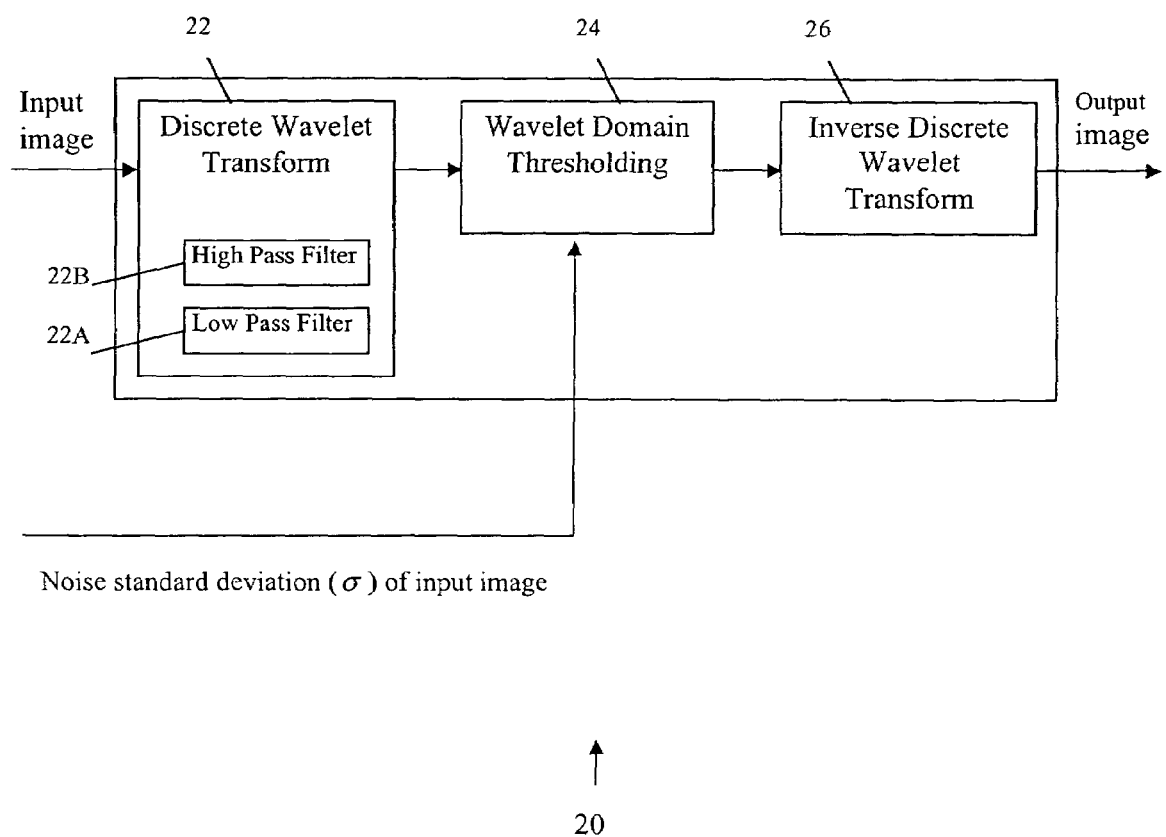
FIG. 2 is a block diagram of an embodiment of a processor for reducing video image noise according to the present invention.

FIG. 2 shows a block diagram of an embodiment of a noise reduction processor 20 using discrete wavelet transform and inverse discrete wavelet transform, according to the present invention. The processor inputs are the video image and its noise standard deviation σ. In this example, it is assumed that the noise standard deviation σ is known and is provided by the system. Typically, the noise standard deviation σ can be directly estimated from the input image.

The example noise reduction processor in FIG. 1 comprises a discrete wavelet transform function (dwt) 22, a wavelet domain thresholding function (wdt) 24 and an inverse discrete wavelet transform function (idwt) 26. The input image is transformed in the dwt 22 to decompose the image into K resolution levels, as described above. Preferably, the decomposition level K is set to 4, but other values for k can also be selected. Although various discrete wavelet transforms can be used, in this example a 9/7 wavelet or the 5/3 wavelet are utilized, as presented in the paper: a. Cohen, i. Daubechies, and j.-c. Feauveau, "biorthogonal bases of compactly supported wavelets", communications on pure and applied mathematics, vol. 45, pp. 485-560, 1992.

In one example, the low pass filter 22a comprises a 9-tap low pass filter with coefficients (0.026749, −0.016864, −0.078223, 0.266864, 0.602949, 0.266864, −0.078223, −0.016864, 0.026749), and the high pass filter 22b comprises a 7-tap high pass filter with coefficients (−0.045636, 0.028772, 0.295636, −0.557543, 0.295636, 0.028772, −0.045636). The 5/3 wavelet has a 5-tap low pass filter with coefficients (−0.125, 0.250, 0.750, 0.250, −0.125), and a high pass filter with coefficients (0.250, −0.500, 0.250).

Figure 3:
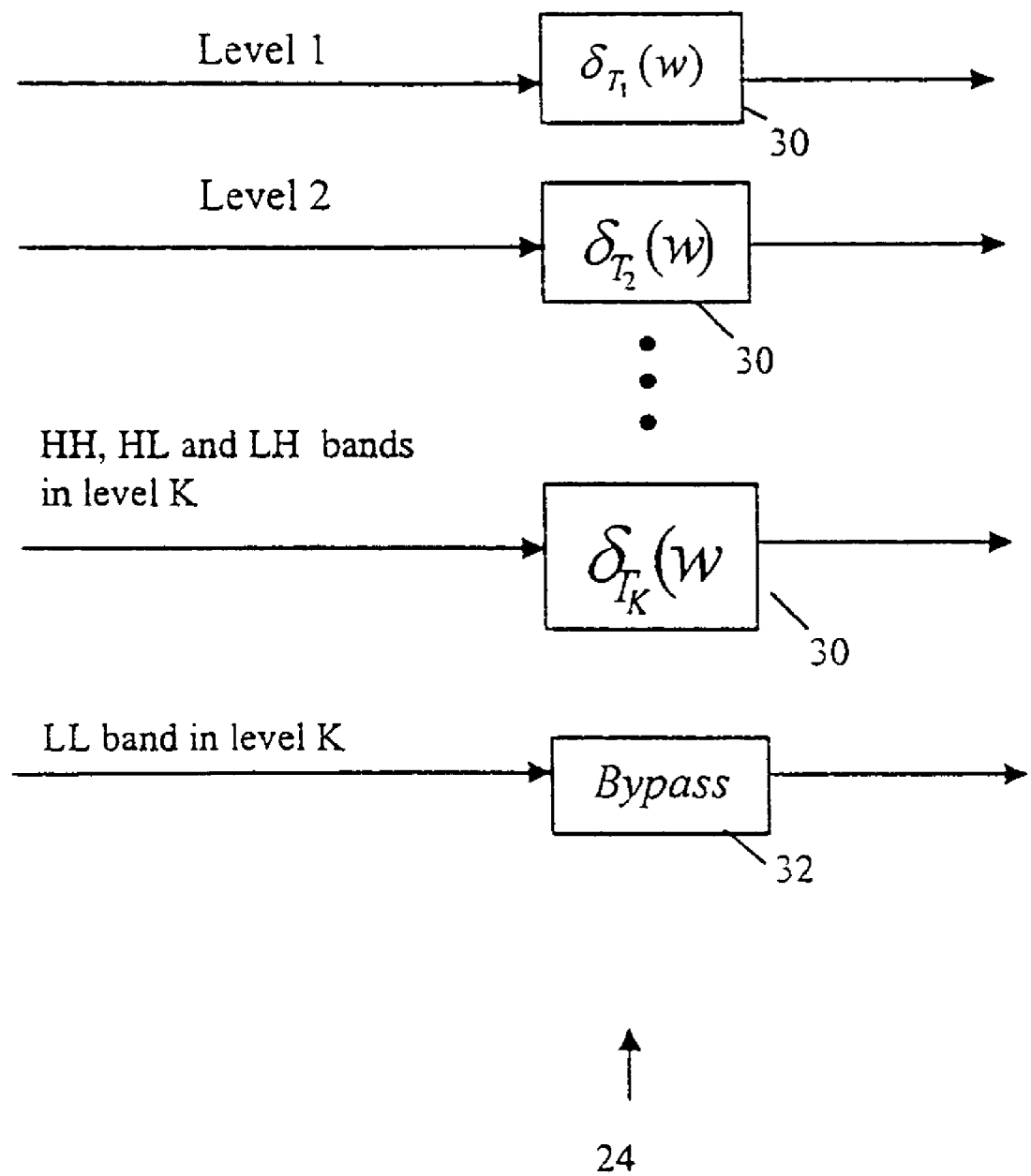
FIG. 3 is a block diagram of an embodiment of a wavelet domain thresholding function in FIG. 2.

After the input image has been decomposed into K levels by the dwt 22, the wdt 24 applies a thresholding function $\delta_T(w)$ with a different threshold value T to every wavelet coefficient of every level. This is performed for all coefficients except for the wavelet coefficients in the ll band of the deepest level, where the data therein are simply bypassed. FIG. 3 shows a block diagram for an example wdt 24 with multiple thresholding function units 30 and a bypass unit 32, wherein each thresholding function is $\delta_T(w)=\text{sgn}(w)\max(|w|-T,0)$ for a threshold value t. The function sgn(w) returns the sign of the wavelet coefficient value w, and the function max(a,b) returns the larger one of the two values a and b.

As mentioned in the background section above, an important step in wavelet based noise reduction is proper selection of the threshold values. An example of such selection method according to the present invention is now described. The values $T_i$ denote the threshold value for decomposition level i with i=1,2, ..., K. the threshold values $T_i$ can be represented by example as:

$$T_i = C_i * \sigma \text{ with } i=1,2,\ldots,K,$$

Wherein σ is the noise standard deviation of the input image, and $C_i$'s are the parameters which are determined by the discrete wavelet transform that is being used. The $C_i$ parameters characterize the relationship between the noise distribution in the wavelet domain and the noise distribution in the spatial domain. If $\sigma_i$ denotes the standard deviation of the noise distribution in level i of the wavelet decomposition, then: $\sigma_i = C_i * \sigma$.

The $C_i$ parameters depend only on the specific discrete wavelet transform. Each discrete wavelet transform has its own unique set of $C_i$ parameters. For each discrete wavelet transform, the corresponding $C_i$ parameters need to be calculated only once. Once a discrete wavelet transform's $C_i$ parameters are known, they can be used in any noise reduction system that uses this discrete wavelet transform, and need not be recalculated again.

An example method of determining the $C_i$ parameters for a given discrete wavelet transform is now described. Let $f(x_1,x_2)$ denote a constant image, wherein the image has the same gray scale value (e.g., 128) at every pixel $(x_1,x_2)$. Then gaussian noise with zero mean and the standard deviation value σ, are added to the constant image $f(x_1,x_2)$, wherein $f^\sigma(x_1, x_2)$ denotes the resulting noisy image. Next, a discrete wavelet transform is applied to the noisy image $f^\sigma(x_1, x_2)$, wherein $$f^\sigma_{HH(i)}(n, m)$$

denotes the hh subband image in the decomposition level i (FIG. 1). Then, the noise standard deviation $\sigma_i$ of level i can be computed as:

$$\sigma_i = \sqrt{\frac{\sum_{n=1}^{N_i} \sum_{m=1}^{M_i} (f^\sigma_{HH(i)}(n, m) - \mu_i)^2}{N_i \times M_i}}$$

Wherein $N_i \times M_i$ is the size of the subband image $$f^\sigma_{HH(i)}(n, m),$$

and $\mu_i$ is the mean of the subband image $$f^\sigma_{HH(i)}(n, m),$$

where:

$$\mu_i = \sqrt{\frac{\sum_{n=1}^{N_i} \sum_{m=1}^{M_i} f^\sigma_{HH(i)}(n, m)}{N_i \times M_i}}.$$

If $\sigma$ is varied, and the above procedure is repeated to compute the corresponding $\sigma_i$, then by computing the quotient $$\frac{\sigma_i}{\sigma}$$

it can be seen that with the value of $\sigma$ varying, the quotient $$\frac{\sigma_i}{\sigma}$$

essentially remains constant over. The minor changes in this quotient are caused by the randomness of the added gaussian noise. This essentially constant quotient represents the $C_i$ parameter, i.e., $$C_i = \frac{\sigma_i}{\sigma}.$$

For more accuracy, the average of the quotients $$\frac{\sigma_i}{\sigma}$$

for several different $\sigma$ values can be determined, and that average can be used as the final value of the $C_i$. This procedure for computing the $C_i$ parameters is repeated for i=1,2, . . . , K to determine all the $C_i$'s.

Two examples of the computed $C_i$ parameters for two discrete wavelet transforms are shown below. The first example is for the 9/7 wavelet mentioned above. For the 9/7 wavelet, with 4 levels of decomposition, $C_1$=0.50, $C_2$=0.28, $C_3$=0.13, and $C_4$=0.06. As such, using the 9/7 wavelet for noise reduction with 4 levels of decomposition, then the threshold values $T_i$ are selected as: $T_1$=0.50*$\sigma$, $T_2$=0.28*$\sigma$, $T_3$=0.13*$\sigma$, and $T_4$=0.06*$\sigma$, wherein $\sigma$ is the noise standard deviation of the input image.

The second example is for the 5/3 wavelet mentioned above. For the 5/3 wavelet with 4 levels of decomposition, $C_1$=0.38, $C_2$=0.33, $C_3$=0.22, and $C_4$=0.13.

As such, using the 5/3 wavelet for noise reduction with 4 levels of decomposition, the threshold values $T_i$ are selected as: $T_1$=0.38*$\sigma$, $T_2$=0.33*$\sigma$, $T_3$=0.22*$\sigma$, and $T_4$=0.13*$\sigma$, wherein $\sigma$ is the noise standard deviation of the input image.

Referring back to system 20 of FIG. 2, the computed threshold values are then applied to the decomposed images by the wdt 24 as described above. After performing wavelet domain thresholding in wdt 24, the idwt 26 applies an inverse discrete wavelet transform to the resulting data from the wdt 24 as described above, to reconstruct the image. The output of the inverse discrete wavelet transform by the idwt 26 represents the output image with reduced noise.

Figure 4:
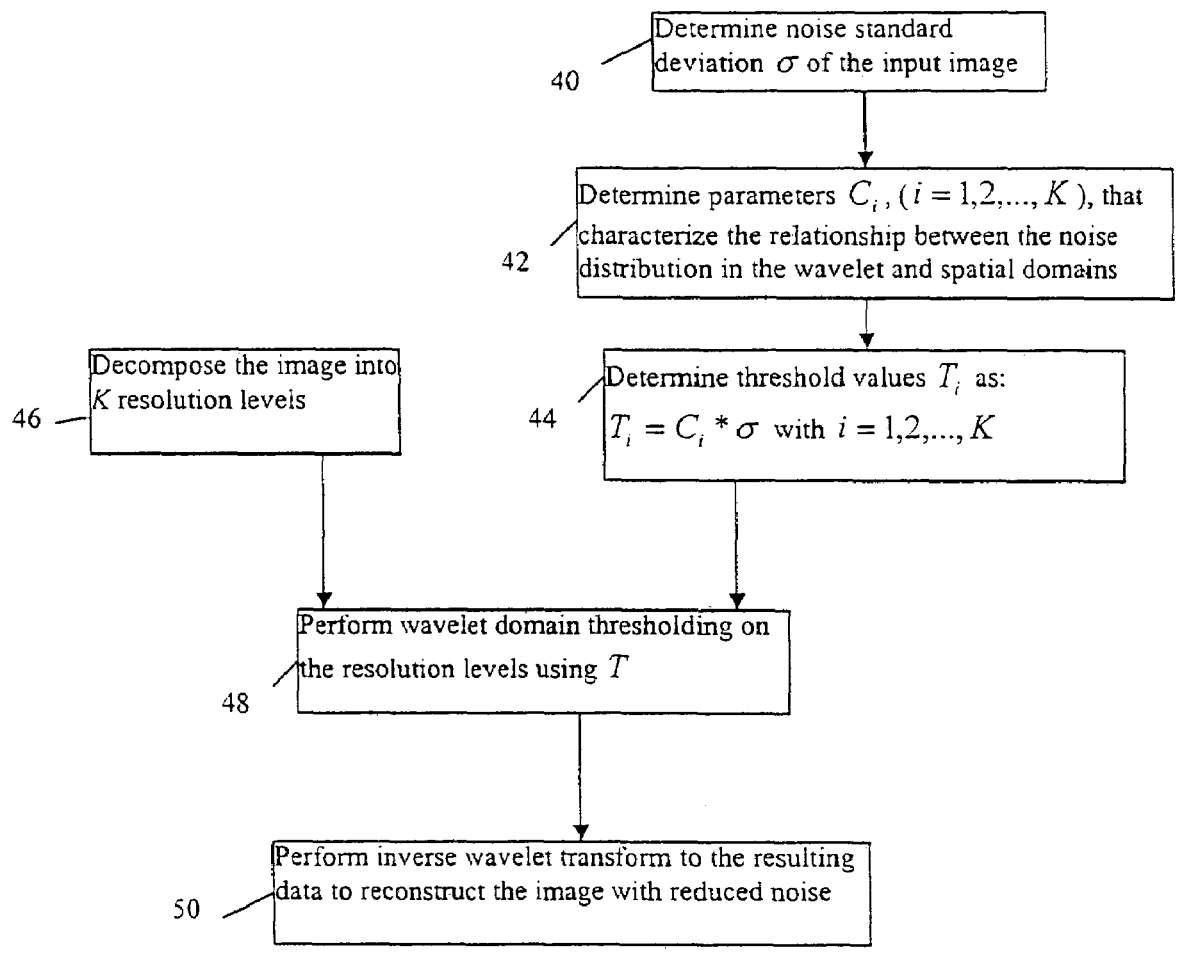
FIG. 4 shows a flowchart of the steps of an embodiment of the method of reducing noise in a video image according to the present invention.

To simplify understanding, FIG. 4 shows a flowchart of the steps of an embodiment of the method of reducing noise in a video image according to the present invention. The general method steps are selecting proper threshold values $T_i$, and then using the threshold values to reduce image noise by wavelet thresholding. Selecting the threshold values includes the steps of: determining the noise standard deviation $\sigma$ of the input image (step 40); determining the $C_i$ parameters that characterize the relationship between the noise distribution in the wavelet domain and the noise distribution in the spatial domain (step 42); and determining threshold values $T_i$ as: $T_i$=$C_i$*$\sigma$ with i=1,2, . . . , K (step 44).

Using the threshold values to reduce image noise by wavelet thresholding, includes the steps of: decomposing the image into k resolution levels using wavelet transformation (step 46); performing wavelet domain thresholding on the resolution levels using threshold values $T_i$ (step 48); and performing inverse wavelet transformation to the resulting data to reconstruct the image with reduced noise (step 50). An example implementation of the method in FIG. 4 is that shown in FIGS. 2-3.

The aforementioned systems in FIGS. 2 and 3 according to the present invention, can be implemented as program instructions for execution by a processor, as logic circuits, as asic, as firmware, etc., as is known to those skilled in the art. Therefore, the present invention is not limited to the example embodiments described herein.

The present invention has been described in considerable detail with reference to certain preferred versions thereof; however, other versions are possible. For example, other frequency transforms can be used which involve mapping of functions of a function space on the coefficients of basis functions, where the basis functions have a locality in the frequency spectrum. As such, functions are decomposed into wave-like components (as e.g. Cosine, sine or wavelets). The result of the transform are the coefficients of the components (base functions), i.e. Their share (factor) in the original function. The transform can be reversed (mostly perfectly or nearly perfectly) by the sum of the correctly weighted base functions.

As such, instead of a discrete wavelet transform, other wavelet transforms such as continuous wavelet transform, fast wavelet transform, wavelet packets and complex wavelet transform can be used. Furher, instead of a wavelet transform other transforms such as discrete cosine transforms may be utilized. Therefore, the spirit and scope of the appended claims should not be limited to the description of the preferred versions contained herein.

What is claimed is:

1. A method of reducing noise in a video image, comprises the steps of:
   (a) decomposing the video image by a transform into multiple resolution levels representing different classes of image data;
   (b) selecting threshold values based on the relationships between the noise standard deviations of different decomposition levels in the transform domain and the noise standard deviation of the original video image;
   (c) applying a thresholding function to the transform coefficients of the classes of data in different resolution levels with different selected threshold values, to essentially eliminate image information corresponding to noise in the classes of data; and
   (d) reassembling the classes of data at said multiple resolution levels into a reconstructed image with reduced noise.

2. The method of claim 1, wherein:
   In step (a) decomposing the image further includes the steps of decomposing the video image by wavelet transformation into multiple resolution levels representing different classes of image data;
   In step (b) selecting the threshold values further includes the steps of selecting the threshold values based on the relationships between the noise standard deviations of different decomposition levels in the wavelet domain and the noise standard deviation of the original video image;
   In step (c) applying the thresholding function further includes the steps of applying the thresholding function to the wavelet coefficients of the classes of data in different resolution levels with different selected threshold values, to essentially eliminate image information corresponding to noise in the classes of data; and
   In step (d) reassembling the image further includes the steps of reassembling the classes of data at said multiple resolution levels into a reconstructed image with reduced noise using an inverse wavelet transformation.

3. The method of claim 2, wherein in step (b) the threshold values are selected based on the relationships between the noise standard deviations of different decomposition levels in the wavelet domain and the noise standard deviation of the original image.

4. The method of claim 2, wherein in step (b) each threshold value for each resolution level is based on the noise standard deviation of the input image, and a linear relationship between the noise distribution in the wavelet domain and the noise distribution in the spatial domain.

5. The method of claim 2, wherein step (c) further includes the steps of applying a thresholding function $\delta_T(w)$ =sgn(w)max(|w|−T,0) to different wavelet resolution levels with a different threshold value T, wherein each threshold value $T_i$ for level i is represented as:

$$T_i = C_i * \sigma \text{ with } i=1,2,\ldots,K,$$

Wherein: k represents the number of resolution levels;
   $\sigma$ represents the noise standard deviation of the input image;
   $C_i$'s represent a linear relationship between the noise distribution in the wavelet domain and the noise distribution in the spatial domain;
   sgn(w) provides the sign of a wavelet coefficient value w; and
   max(a,b) provides the larger one of the two values a and b.

6. The method of claim 5, wherein the wavelet transform comprises a 9/7 wavelet.

7. The method of claim 6, wherein:
   The steps of decomposing the video image using the 9/7 wavelet transform further includes the steps of using a 9-tap low pass filter with coefficients (0.026749, −0.016864, −0.078223, 0.266864, 0.602949, 0.266864, −0.078223, −0.016864, 0.026749), and using 7-tap high pass filter with coefficients (−0.045636, 0.028772, 0.295636, −0.557543, 0.295636, 0.028772, −0.045636), for decomposing the input image up to 4 levels;
   The steps of applying the thresholding function further includes the steps of applying the threshold function to each level i, wherein i=1,2,3,4, with threshold values $T_1=0.50*\sigma$, $T_2=0.28*\sigma$, $T_3=0.13*\sigma$, and $T_4=0.06*\sigma$, such that $\sigma$ is the noise standard deviation of the input image; and
   The steps of reassembling the image further comprises the steps of performing an the inverse 9/7 wavelet transform to reconstruct the image.

8. The method of claim 5, wherein the wavelet transform comprises a 5/3 wavelet.

9. The method of claim 8, wherein:
   The steps of decomposing the video image using the 5/3 wavelet transform further includes the steps of using a 5-tap low pass filter with coefficients (−0.125, 0.250, 0.750, 0.250, −0.125), and using 3-tap high pass filter with coefficients (0.250, −0.500, 0.250), for decomposing the input image up to 4 levels;
   The steps of applying the thresholding function further includes the steps of applying the threshold function to each level i, wherein i=1,2,3,4, with threshold values $T_1=0.38*\sigma$, $T_2=0.33*\sigma$, $T_3=0.22*\sigma$, and $T_4=0.13*\sigma$, such that $\sigma$ is the noise standard deviation of the input image; and
   The steps of reassembling the image further comprises the steps of performing an the inverse 5/3 wavelet transform to reconstruct the image.

10. The method of claim 5, further comprising the steps of determining the $C_i$ parameters for a discrete wavelet transform such that:
   The noise standard deviations of different decomposition levels in the wavelet domain decrease as the decomposition levels increase, and
   The noise standard deviations in the wavelet domain are linearly dependent on the noise standard deviation of the original image.

11. The method of claim 10, further comprising the steps of determining the $C_i$ parameters based on the linear dependency between the noise standard deviations in the wavelet domain and the noise standard deviation of the original image, wherein the linear dependency provides a choice of the threshold values.

12. A method of reducing noise in a video image, comprises the steps of:
   (a) decomposing the video image by discrete wavelet transformation into multiple resolution levels;
   (b) selecting the threshold values based on the relationships between the noise standard deviations of different decomposition levels in the wavelet domain and the noise standard deviation of the original video image;
   (c) applying a thresholding function to the wavelet coefficients of the different resolution levels with different selected threshold values; and
   (d) reassembling the image by inverse discrete wavelet transformation of the coefficients of the different resolution levels, wherein the reassembled image has reduced noise.

13. The method of claim 12, wherein in step (b) the threshold values are selected based on the relationships between the noise standard deviations of different decomposition levels in the wavelet domain and the noise standard deviation of the original image.

14. The method of claim 12, wherein in step (b) each threshold value for each resolution level is based on the noise standard deviation of the input image, and a linear relationship between the noise distribution in the wavelet domain and the noise distribution in the spatial domain.

15. The method of claim 12, wherein step (c) further includes the steps of applying a thresholding function $\delta_T(w)$ =sgn(w)max(|w|−T,0) to different wavelet resolution levels with a different threshold value T, wherein each threshold value $T_i$ for level i is represented as:

$$T_i = C_i * \sigma \text{ with } i=1,2,\ldots,K,$$

Wherein: k represents the number of resolution levels;
   $\sigma$ represents the noise standard deviation of the input image;
   $C_i$'s represent a linear relationship between the noise distribution in the wavelet domain and the noise distribution in the spatial domain;
   sgn(w) provides the sign of a wavelet coefficient value w; and
   max(a,b) provides the larger one of the two values a and b.

16. The method of claim 15, wherein the wavelet transform comprises a 9/7 discrete wavelet transform.

17. The method of claim 16, wherein:
   The steps of decomposing the video image using the 9/7 wavelet transform further includes the steps of using a 9-tap low pass filter with coefficients (0.026749, −0.016864, −0.078223, 0.266864, 0.602949, 0.266864, −0.078223, −0.016864, 0.026749), and using 7-tap high pass filter with coefficients (−0.045636, 0.028772, 0.295636, −0.557543, 0.295636, 0.028772, −0.045636), for decomposing the input image up to 4 levels;
   The steps of applying the thresholding function further includes the steps of applying the threshold function to each level i, wherein i=1,2,3,4, with threshold values $T_1=0.50*\sigma$, $T_2=0.28*\sigma$, $T_3=0.13*\sigma$, and $T_4=0.06*\sigma$, such that $\sigma$ is the noise standard deviation of the input image; and
   The steps of reassembling the image further comprises the steps of performing an the inverse 9/7 discrete wavelet transform to reconstruct the image.

18. The method of claim 15, wherein the wavelet transform comprises a 5/3 discrete wavelet transform.

19. The method of claim 18, wherein:
   The steps of decomposing the video image using the 5/3 wavelet transform further includes the steps of using a 5-tap low pass filter with coefficients (−0.125, 0.250, 0.750, 0.250, −0.125), and using 3-tap high pass filter with coefficients (0.250, −0.500, 0.250), for decomposing the input image up to 4 levels;
   The steps of applying the thresholding function further includes the steps of applying the threshold function to each level i, wherein i=1,2,3,4, with threshold values $T_1=0.38*\sigma$, $T_2=0.33*\sigma$, $T_3=0.22*\sigma$, and $T_4=0.13*\sigma$, such that $\sigma$ is the noise standard deviation of the input image; and
   The steps of reassembling the image further comprises the steps of performing an the inverse 5/3 discrete wavelet transform to reconstruct the image.

20. The method of claim 15, further comprising the steps of determining the $C_i$ parameters for a discrete wavelet transform such that:
   The noise standard deviations of different decomposition levels in the wavelet domain decrease as the decomposition levels increase, and
   The noise standard deviations in the wavelet domain are linearly dependent on the noise standard deviation of the original image.

21. The method of claim 20, further comprising the steps of determining the $C_i$ parameters based on the linear dependency between the noise standard deviations in the wavelet domain and the noise standard deviation of the original image, wherein the linear dependency provides a choice of the threshold values.

22. An image processing system for reducing noise in a video image, comprising:
   (a) transform processor that decomposes the video image into multiple resolution levels representing different classes of image data;
   (b) a thresholding processor the applies a thresholding function to the transform coefficients of the classes of data in different resolution levels with different selected threshold values, to essentially eliminate image information corresponding to noise in the classes of data,
      Wherein the threshold values are based on the relationships between the noise standard deviations of different decomposition levels in the transform domain and the noise standard deviation of the original video image; and
   (s) an inverse transform processor that reassembles the classes of data at said multiple resolution levels into a reconstructed image with reduced noise.

23. The system of claim 22, wherein:
   The transform processor comprises a wavelet transform processor that decomposes the video image by wavelet transformation into multiple resolution levels representing different classes of image data;
   The threshold values are based on the relationships between the noise standard deviations of different decomposition levels in the wavelet domain and the noise standard deviation of the original video image;
   The thresholding processor applies the thresholding function to the wavelet coefficients of the classes of data in different resolution levels with different selected threshold values, to essentially eliminate image information corresponding to noise in the classes of data; and The inverse transform processor reassembles the classes of data at said multiple resolution levels into a reconstructed image with reduced noise using an inverse wavelet transformation.

24. The system of claim 23, wherein the threshold values are based on the relationships between the noise standard deviations of different decomposition levels in the wavelet domain and the noise standard deviation of the original image.

25. The system of claim 23, wherein each threshold value for each resolution level is based on the noise standard deviation of the input image, and a linear relationship between the noise distribution in the wavelet domain and the noise distribution in the spatial domain.

26. The system of claim 23, wherein the threshold processor further applies the thresholding function $\delta_T(w)=\text{sgn}(w)\max(|w|-T,0)$ to different wavelet resolution levels with a different threshold value T, wherein each threshold value $T_i$ for level i is represented as:

$$T_i = C_i * \sigma \text{ with } i=1,2,\ldots,K,$$

Wherein: k represents the number of resolution levels;
$\sigma$ represents the noise standard deviation of the input image;
$C_i$'s represent a linear relationship between the noise distribution in the wavelet domain and the noise distribution in the spatial domain;
sgn(w) provides the sign of a wavelet coefficient value w; and
max(a,b) provides the larger one of the two values a and b.

27. The system of claim 26, wherein the transform processor comprises a 9/7 wavelet transform processor.

28. The system of claim 27, wherein:
The transform processor comprises a 9-tap low pass filter with coefficients (0.026749, −0.016864, −0.078223, 0.266864, 0.602949, 0.266864, −0.078223, −0.016864, 0.026749), and a 7-tap high pass filter with coefficients (−0.045636, 0.028772, 0.295636, −0.557543, 0.295636, 0.028772, −0.045636), for decomposing the input image up to 4 levels;
The thresholding processor applies the threshold function to each level i, wherein i=1,2,3,4, with threshold values $T_1=0.50*\sigma$, $T_2=0.28*\sigma$, $T_3=0.13*\sigma$, and $T_4=0.06*\sigma$, such that $\sigma$ is the noise standard deviation of the input image; and
The inverse transform processor comprises an inverse 9/7 wavelet transform processor.

29. The system of claim 26, wherein the transform processor comprises a 5/3 wavelet transform processor.

30. The system of claim 29, wherein:
The transform processor comprises a 5-tap low pass filter with coefficients (−0.125, 0.250, 0.750, 0.250, −0.125), and a 3-tap high pass filter with coefficients (0.250, −0.500, 0.250), for decomposing the input image up to 4 levels;
The thresholding processor applies the threshold function to each level i, wherein i=1,2,3,4, with threshold values $T_1=0.38*\sigma$, $T_2=0.33*\sigma$, $T_3=0.22*\sigma$, and $T_4=0.13*\sigma$, such that $\sigma$ is the noise standard deviation of the input image; and
The inverse transform processor comprises an inverse 5/3 wavelet transform processor.

31. The system of claim 26, wherein the $C_i$ parameters for a discrete wavelet transform are selected such that:
The noise standard deviations of different decomposition levels in the wavelet domain decrease as the decomposition levels increase, and
The noise standard deviations in the wavelet domain are linearly dependent on the noise standard deviation of the original image.

32. The system of claim 31, wherein the $C_i$ parameters are based on the linear dependency between the noise standard deviations in the wavelet domain and the noise standard deviation of the original image, wherein the linear dependency provides a choice of the threshold values.

* * * * *